(12) United States Patent
Rajwar et al.

(10) Patent No.: US 8,180,967 B2
(45) Date of Patent: May 15, 2012

(54) TRANSACTIONAL MEMORY VIRTUALIZATION

(75) Inventors: Ravi Rajwar, Portland, OR (US); Haitham H. Akkary, Portland, OR (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 11/394,622

(22) Filed: Mar. 30, 2006

(65) Prior Publication Data

US 2007/0239942 A1 Oct. 11, 2007

(51) Int. Cl.
*G06F 12/00* (2006.01)
(52) U.S. Cl. .. 711/135; 711/147; 711/156; 711/E12.039
(58) Field of Classification Search .................. 711/118, 711/147, 154, 156
See application file for complete search history.

(56) References Cited

U.S. PATENT DOCUMENTS

| | | | |
|---|---|---|---|
| 5,428,761 A | 6/1995 | Herlihy et al. | |
| 5,652,859 A | 7/1997 | Mulla et al. | |
| 5,765,208 A | 6/1998 | Nelson et al. | |
| 5,835,961 A | 11/1998 | Harvey et al. | |
| 6,038,645 A * | 3/2000 | Nanda et al. | 711/141 |
| 6,640,285 B1 | 10/2003 | Bopardikar et al. | |
| 6,681,293 B1 * | 1/2004 | Solomon et al. | 711/122 |
| 6,877,088 B2 | 4/2005 | David | |
| 6,895,527 B1 | 5/2005 | Quach et al. | |
| 7,216,202 B1 | 5/2007 | Chaudhry et al. | |
| 7,263,585 B2 | 8/2007 | Hooker et al. | |
| 7,395,382 B1 | 7/2008 | Moir | |
| 7,809,903 B2 | 10/2010 | Adl-tabatabai | |
| 2002/0108025 A1 | 8/2002 | Shaylor | |
| 2003/0033510 A1 | 2/2003 | Dice | |
| 2004/0015642 A1 | 1/2004 | Moir et al. | |
| 2004/0034673 A1 | 2/2004 | Moir et al. | |
| 2004/0068618 A1 | 4/2004 | Hooker | |
| 2005/0235067 A1 * | 10/2005 | Creta et al. | 710/5 |
| 2006/0085591 A1 | 4/2006 | Kumar et al. | |
| 2006/0161740 A1 | 7/2006 | Kottapalli et al. | |
| 2006/0184840 A1 * | 8/2006 | Floyd et al. | 714/48 |
| 2006/0259589 A1 * | 11/2006 | Lerman et al. | 709/219 |
| 2006/0265557 A1 | 11/2006 | Peinado et al. | |
| 2006/0294326 A1 | 12/2006 | Jacobson et al. | |
| 2007/0043915 A1 | 2/2007 | Moir et al. | |
| 2007/0143287 A1 | 6/2007 | Adl-tabatabai | |

(Continued)

FOREIGN PATENT DOCUMENTS

WO WO/2007078538 7/2007

(Continued)

OTHER PUBLICATIONS

Rajwar et al., "Virtualizing Transactional Memory", 2005, IEEE proceedings of the 32nd Symposium on Computer Arichitecture.*

(Continued)

*Primary Examiner* — Michael Krofcheck
(74) *Attorney, Agent, or Firm* — Blakely, Sokoloff, Taylor & Zafman LLP

(57) ABSTRACT

Methods and apparatus to provide transactional memory execution in a virtualized mode are described. In one embodiment, data corresponding to a transactional memory access request may be stored in a portion of a memory after an operation corresponding to the transactional memory access request causes an overflow and a stored value may be updated for an occurrence of the overflow.

33 Claims, 9 Drawing Sheets

U.S. PATENT DOCUMENTS

| | | |
|---|---|---|
| 2007/0156780 A1 | 7/2007 | Saha et al. |
| 2007/0156994 A1 | 7/2007 | Akkary et al. |
| 2007/0162520 A1 | 7/2007 | Petersen et al. |
| 2007/0186056 A1 | 8/2007 | Saha et al. |
| 2007/0239797 A1 | 10/2007 | Cattell et al. |
| 2007/0260942 A1 | 11/2007 | Rajwar et al. |
| 2007/0283108 A1 | 12/2007 | Isherwood et al. |

FOREIGN PATENT DOCUMENTS

| | | |
|---|---|---|
| WO | WO/2007078571 | 7/2007 |
| WO | WO-2007078883 A1 | 7/2007 |
| WO | WO/2007115003 | 10/2007 |

OTHER PUBLICATIONS

U.S. Appl. No. 60/673,445, Lerman et al., "Apparatus and Methods for Posting and Streaming Video," Apr. 2005.*

Herlihy, Maurice et al., "Transactional Memory: Architectural Support for Lock-Free Data Structures", Proceedings of Annual International Symposium on Computer Architecture., (1993), pp. 289-300.

Moir, M. "Hybrid Transactional Memory", *Annoucement Sun Microsystems*, (Jul. 2005), pp. 1-15.

Moir, M. "Hybrid Hardware/ Software Transactional Memory", Internet Citation, (2005), 23 pages.

Lie, S. "Hardware Support for Unbounded Transactional Memory", *Master's Thesis, Masscchusetts Institute of Techonology Department of Electrical Engineering and Computer Science.*, (May 7, 2004), pp. 85-102.

Chang, A. et al., "Architecture and Programming", *ACM Transactions on Computer Systems*, 6(1), (Feb. 1, 1988), pp. 28-52.

Lev, Y. et al., "Towards a Safer Interaction with Transactional Memory By Tracking Object Visibility", *Proceedings of synchronization and Concurrency in Object- Oriented Languages*, (Oct. 7, 2005), pp. 31-38.

*International Search Report and Written Opinion for* Application No. PCT/US2006/048041, (Jun. 12, 2007), 12 pages.

Ananian, C. S., et al., "Unbounded Transactional Memory In: High Performance Computer Architecture", *11th International Symposium*, Edited by IEEE Computer Society,(2005), pp. 316-327.

*International Search Report and Written Opinion for* application No. PCT/UuS2007/064450, 12 pages.

Rajwar, R. et al., "Virtualizing Transactional Memory", IEEE Proceedings of the 32nd International Symposium on Computer Architecture (ISCA'05), Published May 2005.

Final Office Action Received for U.S. Appl. No. 11/394,687, mailed on Jan. 16, 2009, 15 pages.

Non-Final Office action Received for U.S. Appl. No. 11/394,687, mailed on Jun. 25, 2008, 14 pages.

Non-Final Office Action Received for U.S. Appl. No. 11/303,529, mailed on Feb. 9, 2009, 13 pages.

Non-Final Office Action Received for U.S. Appl. No. 11/303,529, mailed on Aug. 19, 2008, 11 pages.

Office Action received for Chinese Patent Application No. 200710126654.9, mailed on Aug. 29, 2008, 5 pages of Office Action and 3 pages of English Translation.

Non-Final Office Action Received for U.S. Appl. No. 11/394,687, mailed on Aug. 12, 2009, 14 pages.

Non Final Office Action Received for U.S. Appl. No. 11/323,724, mailed on Mar. 24, 2009, 18 pages.

Final Office Action Received for U.S. Appl. No. 11/323,724, mailed on Aug. 13, 2008, 23 pages.

Non Final Office Action Received for U.S. Appl. No. 11/323,724, mailed on Dec. 28, 2007, 13 pages.

Non Final Office Action Received for U.S. Appl. No. 11/323,724, mailed on Nov. 24, 2009, 17 pages.

Non-Final Office Action Received for U.S. Appl. No. 11/303,529, mailed on Nov. 16, 2009, 27 pages.

Tanenbaum, A. S., "Structured Computer Organization", pp. 10-12, 1984.

Rajwar, Ravi et al., "Virtualizing Transactional Memory", 12 pages, 2005.

Harris, Tim et al., "Language Support for Lightweight Transactions", *ACM*, OOPSLA, (Oct. 2003), 15 pages.

Office Action received for Chinese Application No. 200710126654.9, mailed on May 12, 2010, 8 Pages of English Translation.

Office Action received for U.S. Appl. No. 11/323,724, mailed on Jun. 2, 2010, 18 Pages.

Office Action received for U.S. Appl. No. 11/394,687, mailed on May 10, 2010, 15 Pages.

Ennals, R., "Software Transactional Memory Should Not be Obstruction-Free", [online], [Retrieved Sep. 14, 2005], retrieved from the Internet at <URL: http://www.cambridge.intelresearch.net/.about.rennals/notlockfree.pdf>.

Hewlett-Packard Development Company, "Memory-Relevant Portions of the Processor", [online], [Retrieved on Sep. 18, 2005], retrieved from the Internet at <URL: http://docs.hp.com/cgi-bin/pfnew.cgi?IN/=/en/5965-4641/ch01s05.html&prin- table=1>.

Lie, S., "An Integrated Hardware-Software Approach to Transactional Memory", 6.895 Theory of Parallel Systems, [Paper], pp. 1-18.

Lie, S., "An Integrated Hardware-Software Approach to Transactional Memory", 6.895 Theory of Parallel Systems, [Presentation], Monday Dec. 8, 2003.

Stenstrom, P., "A Survey of Cache Coherence Schemes for Multiprocessors", Computer, vol. 23, Issue 6, Jun. 1990, pp. 12-24.

Lev, Y., and J. Maessen, "Towards a Safer Interaction with Transactional Memory by Tracking Object Visibility", Proceedings of Synchronization and Concurrency in Object-Oriented Languages (SCOOL), Oct. 7, 2005, pp. 31-38, [XP-002432120].

Stonebraker, M "Virtual memory transaction management" Operating Systems Review USA, vol. 18, No. 2, Apr. 1984, pp. 8-16.

Sukha, J., "Memory-Mapped Transactions", Master's Thesis, Massachusetts Institute of Technology Department of Electrical Engineering and Computer Science, Jun. 2005, 92 pp., [XP-002434529].

Office Action from U.S. Appl. No. 11/323,724, mailed Aug. 3, 2011, 21 pgs.

Notice of Allowance from U.S. Appl. No. 11/394,687, mailed Aug. 31, 2011, 4 pgs.

Notice of Allowance from U.S. Appl. No. 11/394,687, mailed May 20, 2011, 6 pgs.

Office Action from U.S. Appl. No. 11/394,687, mailed Jan. 11, 2011, 15 pgs.

Foreign counterpart Office Action China Patent Application No. 200710126654.9, mailed May 12, 2010, 8 pages.

Ananian, "Unbounded Transactional Memory" MIT Computer Science and Artificial Intelligence Laboratory, Feb. 2004, pp. 9-10.

* cited by examiner

| # | CLASS | NAME | ACTION | DESCRIPTION |
|---|---|---|---|---|
| 1 | EXECUTION STATE (EXEC_STATE) | X_IDLE | | NO TRANSACTIONAL ACTIVITY |
| 2 | | X_ACTIVE | | IN ATOMIC BLOCK |
| 3 | | X_ABORTED | | ATOMIC BLOCK ABORTED |
| 4 | | X_COMMITTING | | ATOMIC BLOCK BEING COMMITTED |
| 5 | | X_ABORTING | | ATOMIC BLOCK BEING ABORTED |
| 6 | ATTEMPT STATE (ATTEMPT_STATE) | A_IDLE (00) | | NO ABORTS |
| 7 | | A_ABORT_FIRST (01) | | THE FIRST ABORT |
| 8 | | A_ABORT_MULTIPLE (1X) | | SUBSEQUENT ABORTS |
| 10 | SOURCE OF HANDLER CALL (SOURCE) | S_ABORT_INST_RETIRED | | EXPLICIT ABORT BY PROGRAMMER |
| 11 | | S_DISALLOWED_INSTTYPE | TXFR = IP | - SYSCALL, OTHER INSTRUCTIONS THAT MAY CHANGE EXECUTION PRIVILEGE LEVEL<br>-I/O INSTRUCTIONS |
| 12 | | S_RESOURCE_SET_CONFLICT | TXFR = IP<br>TXDR = ADDR | - LIMITED CACHE SPACE<br>- RETRY LIKELY TO FAIL |
| 13 | | S_DISALLOWED_MEMTYPE | TXFR = IP<br>TXDR = ADDR | -ONLY WB MEMORY TYPE IS ALLOWED<br>- RETRY MAY FAIL |
| 14 | | S_EXCEPTION | TXFR = FAULT/ABORT/TRAP IP | |
| 15 | | S_INTERRUPT | | |
| 16 | | S_DATA_CONFLICT_CLEAN | TXDR = ADDR | - RETRY MIGHT NOT SHOW A CONFLICT<br>- HARDWARE PRIORITIES MAY ELIMINATE THESE EVENTS |
| 17 | | S_DATA_CONFLICT_DIRTY | TXDR = ADDR | - RETRY MAY NOT SHOW A CONFLICT<br>- HARDWARE PRIORITIES MAY ELIMINATE THESE EVENTS |
| 18 | | S_USER_EVENT_TYPE | TXDR=ADDR | XAT/XLT MISSING |
| 19 | | S_LD/ST | | INSERT IN XAT OR LOG IN XLT |
| 20 | | X_OVF_COMMITING | | -INDICATES AN OVERFLOW ATOMIC BLOCK IS COMMITTING<br>-MAY BE LOADED BY A MICROCODE ASSIST ON A SNOOP HIT IN M_XSW (269) |
| 21 | | X_OVF_ABORTING | | -INDICATES AN OVERFLOW ATOMIC BLOCK IS ABORTING<br>- MAY BE LOADED BY A MICROCODE ASSIST ON A SNOOP HIT IN M_XSW (260) |
| 22 | CONTROL | C_VTM_MODE | | RUNS ATOMIC EXECUTION IN OVERFLOW MODE. ALL ATOMIC BLOCK DATA IS LOGGED IN VIRTUAL MEMORY (114) |
| 23 | | C_RTM_MODE | | RUNS IN RTM MODE |
| 24 | | C_NON_GATED_OPS | | WHEN SET, LOADS AND STORES ARE EXECUTED AS NON-GATED LOADS AND STORES. (E.G., MAY BE SIMILAR TO A TRANSACTION SUSPEND) ONCE THIS MODE IS ENTERED, ANOTHER TXMBEG PRIOR TO A RESUME MAY CAUSE A FAULT.) |

FIG. 7

TRANSACTIONAL MEMORY VIRTUALIZATION

BACKGROUND

The present disclosure generally relates to the field of electronics. More particularly, an embodiment of the invention relates to transactional memory (TM) virtualization.

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This may be detrimental to system performance and may cause program failures, e.g., due to deadlock bugs.

To reduce performance loss resulting from utilization of locking mechanisms, some computer systems may use transactional memory. Transactional memory generally refers to a synchronization model that allows multiple threads to concurrently access a shared resource, e.g., without utilizing a locking mechanism. As the size of a transaction grows, however, the additional overhead associated with transactional memory execution may decrease performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 7 illustrates an embodiment of a transaction status and control register.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some of the embodiments discussed herein may provide efficient mechanisms for transactional memory virtualization (which may be referred to herein generally as virtual transactional memory (VTM)). Moreover, some of the techniques described herein may allow execution of three types of threads in a single computing system, such as the computing systems discussed herein with reference to FIGS. 1 and 8-9. The three types of threads may include those that correspond to a virtualized transaction mode (also referred to as VTM), a non-virtualized transaction mode (which may be referred to herein generally as a restricted transactional memory (RTM)), and a non-transaction mode. Some of the embodiments may be used in various types of processors, such as the processors discussed with reference to FIGS. 1-9.

Figure 1:
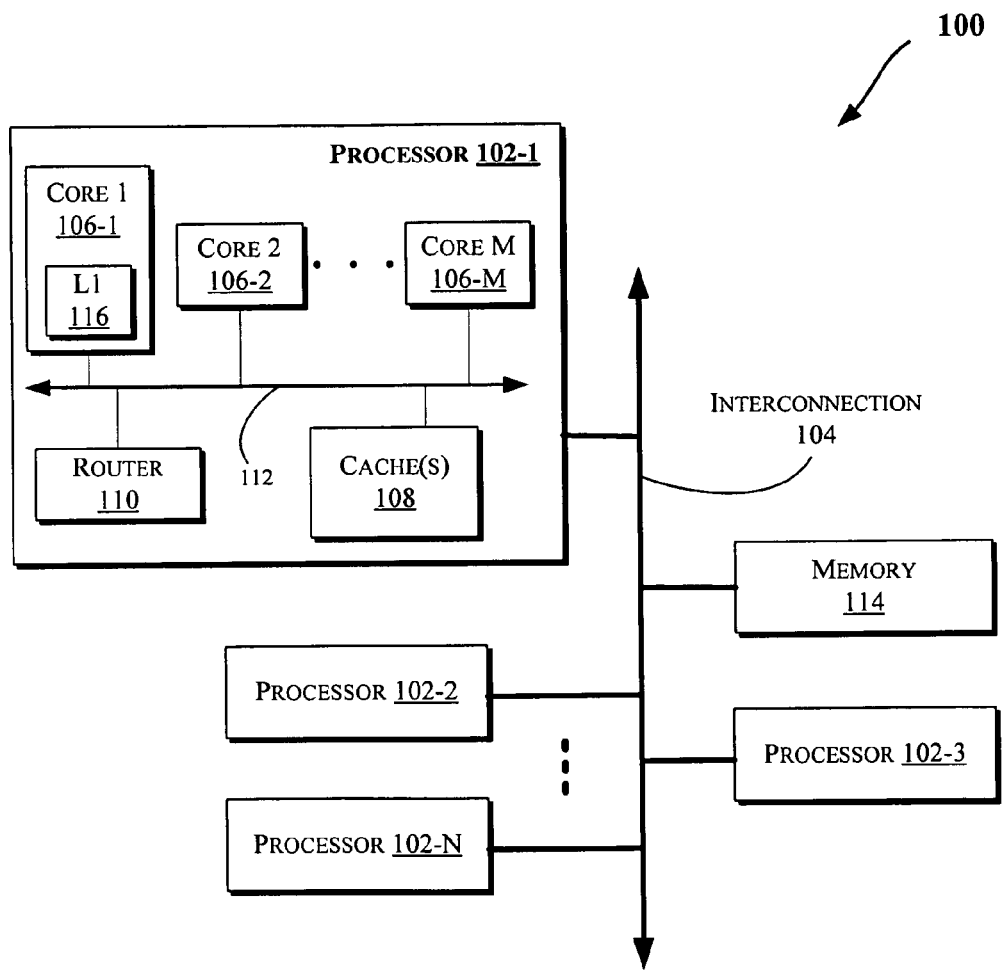
FIGS. 1, 8, and 9 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as one or more caches 108), buses or interconnections (such as a bus or interconnection 112), memory controllers, or other components. In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 may be a level 2 (L2) cache or a last level cache (LLC). Also, each of the cores 106 may include a level 1 (L1) cache (116) (generally referred to herein as "L1 cache 116"). Furthermore, the cache (e.g., cache 106 and/or cache 108) may include a mid-level cache (MLC) and/or a last-level cache (LLC) that may be shared by several cores (106). Various components of the processor 102-1 may communicate with the cache 108 directly, through a bus (e.g., the bus 112), and/or a memory controller or hub.

Figure 2:
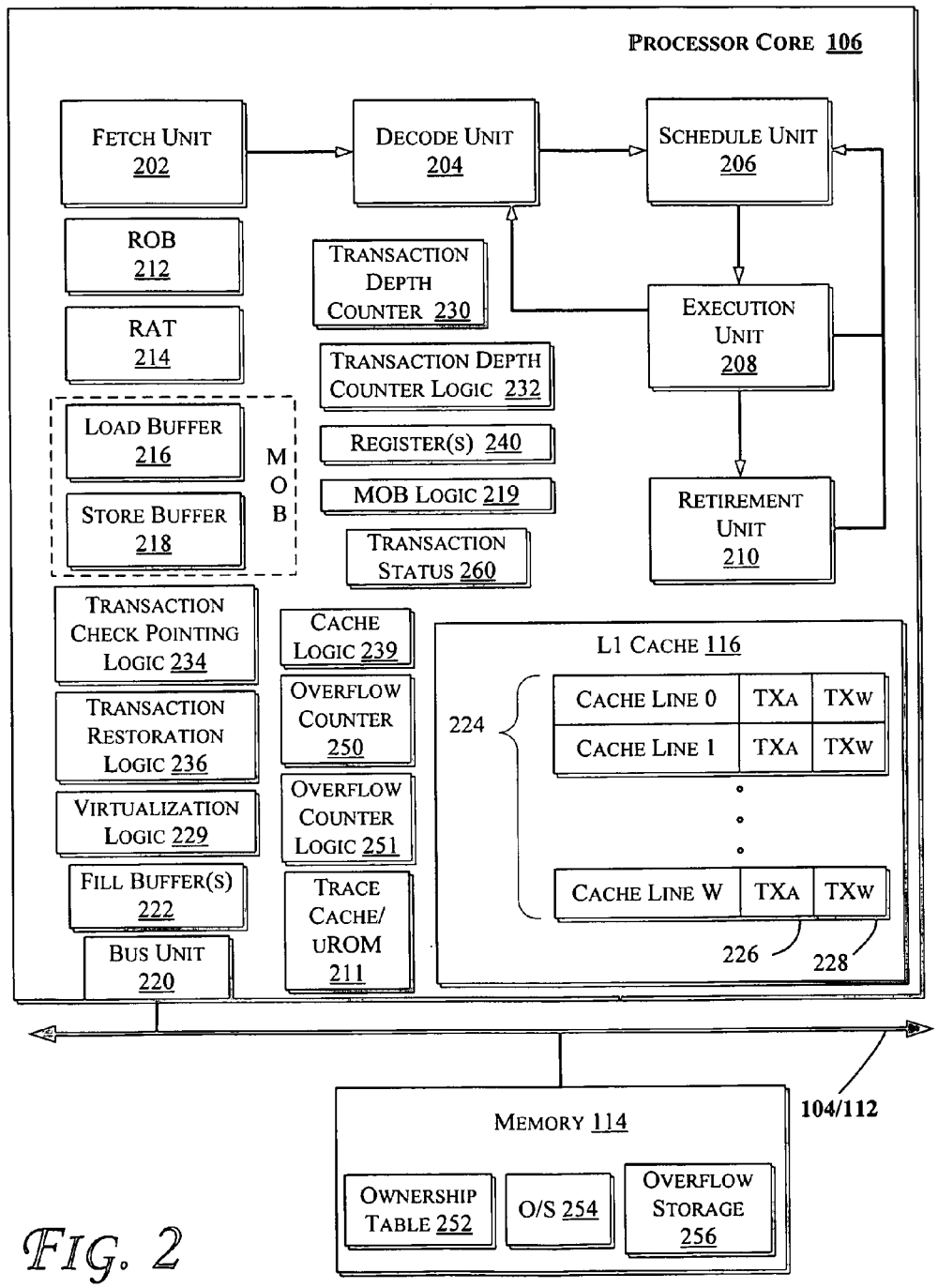
FIG. 2 illustrates a block diagram of portions of a processor core, according to an embodiment of the invention.

FIG. 2 illustrates a block diagram of portions of a processor core 106, according to an embodiment of the invention. In one embodiment, the arrows shown in FIG. 2 illustrate the flow of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components. In an embodiment, the processor core 106 shown in FIG. 2 may be utilized to execute one or more types of threads including those that correspond to a virtualized transaction mode, a non-virtualized (or restricted) transaction mode, and a non-transaction mode.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 8 and 9. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

As illustrated in FIG. 2, the core 106 may additionally include a trace cache or microcode read-only memory (uROM) 211 to store microcode and/or traces of instructions that have been fetched (e.g., by the fetch unit 202). The microcode stored in the uROM 211 may be used to configure various hardware components of the core 106. In an embodiment, the microcode stored in the uROM 211 may be loaded from another component in communication with the processor core 106, such as a computer-readable medium or other storage device discussed with reference to FIGS. 8 and 9. The core 106 may also include a reorder buffer (ROB) 212 to store information about in flight instructions (or uops) for access by various components of the processor core 106. The core 106 may further include a RAT (register alias table) 214 to maintain a mapping of logical (or architectural) registers (such as those identified by operands of software instructions) to corresponding physical registers. In one embodiment, each entry in the RAT 214 may include an ROB identifier assigned to each physical register. Additionally, a load buffer 216 and a store buffer 218 (which may be referred to collectively herein as memory order buffer (MOB)) may store pending memory operations that have not loaded or written back to a main memory (e.g., a memory that is external to the processor core 106, such as memory 114), respectively. An MOB logic 219 may perform various operations relating to the buffers 216 and 218 such as discussed herein. Furthermore, the processor core 106 may include a bus unit 220 to allow communication between components of the processor core 106 and other components (such as the components discussed with reference to FIG. 1) via one or more buses (e.g., buses 104 and/or 112). One or more fill buffers 222 may temporary store data that is received (e.g., over the buses 104 and/or 112) from the memory 114 prior to storing the received data into the cache 116.

As shown in FIG. 2, the cache 116 may include one or more cache lines 224 (e.g., cache lines 0 through W). In an embodiment, for each cache line 224, the cache 116 may include a transaction read bit (TXa) 226 and/or a transaction write bit (TXw) 228 for each thread executing on the core 106. In one embodiment, the cache 116 may include a plurality of bits 228 corresponding to each thread. Bits 226 and 228 may be set or cleared as discussed with reference to FIGS. 4 and 5, e.g., to indicate (load and/or store) access to the corresponding cache line by a transactional memory access request. For example, a virtualization logic 229 may update the bits 226 and/or 228 to indicate access to the corresponding cache line by a virtual transactional memory (VTM) access request. Also, even though in FIG. 2, each cache line 224 is shown as having a respective bit 226 and 228, other configurations are possible. For example, a transaction read bit 226 (or transaction write bit 228) may correspond to a select portion of the cache 116, such as a cache block or other portion of the cache 116. Also, the bits 226 and/or 228 may be stored in locations other than the cache 116, such as in the cache 108 of FIG. 1, the memory 114, or a victim cache, for example.

As will be further discussed with reference to FIG. 4, the core 106 may include a transaction depth counter 230 to store a value corresponding to the number of transactional memory access requests that remain uncommitted. For example, the value stored in the counter 230 may indicate the nesting depth of multiple transactional memory access requests that correspond to the same thread. In one instance, multiple transactional memory access requests may result when one transaction is initiated inside a pending transaction (such as via a library call or other nested procedure). The counter 230 may be implemented as any type of a storage device such as a hardware register or a variable stored in a memory (e.g., the memory 114 or cache 116). The core 106 may also include a transaction depth counter logic 232 to update the value stored in the counter 230. Additionally, as will be further discussed with reference to FIG. 4, the core 106 may include a transaction check pointing logic 234 to check point (or store data corresponding to) the state of various components of the core 106 and a transaction restoration logic 236 to restore the state of various components of the core 106. The core 106 may also include a cache logic 239 which may perform various operations by accessing the cache 116, as will be further discussed herein with reference to FIG. 4, for example. Additionally, the core 106 may include one or more additional registers 240 that correspond to various transactional memory access requests, such as transaction status and control (TXSR) (which is further discussed herein with reference to FIG. 7), transaction instruction pointer (TXIP) (e.g., that may be an instruction pointer to an instruction at the beginning (or immediately preceding) the corresponding transaction), and/or transaction stack pointer (TXSP) (e.g., that may be an stack pointer to the head of a stack that stores various states of one or more components of the core 106), as will be further discussed herein.

Figure 3:
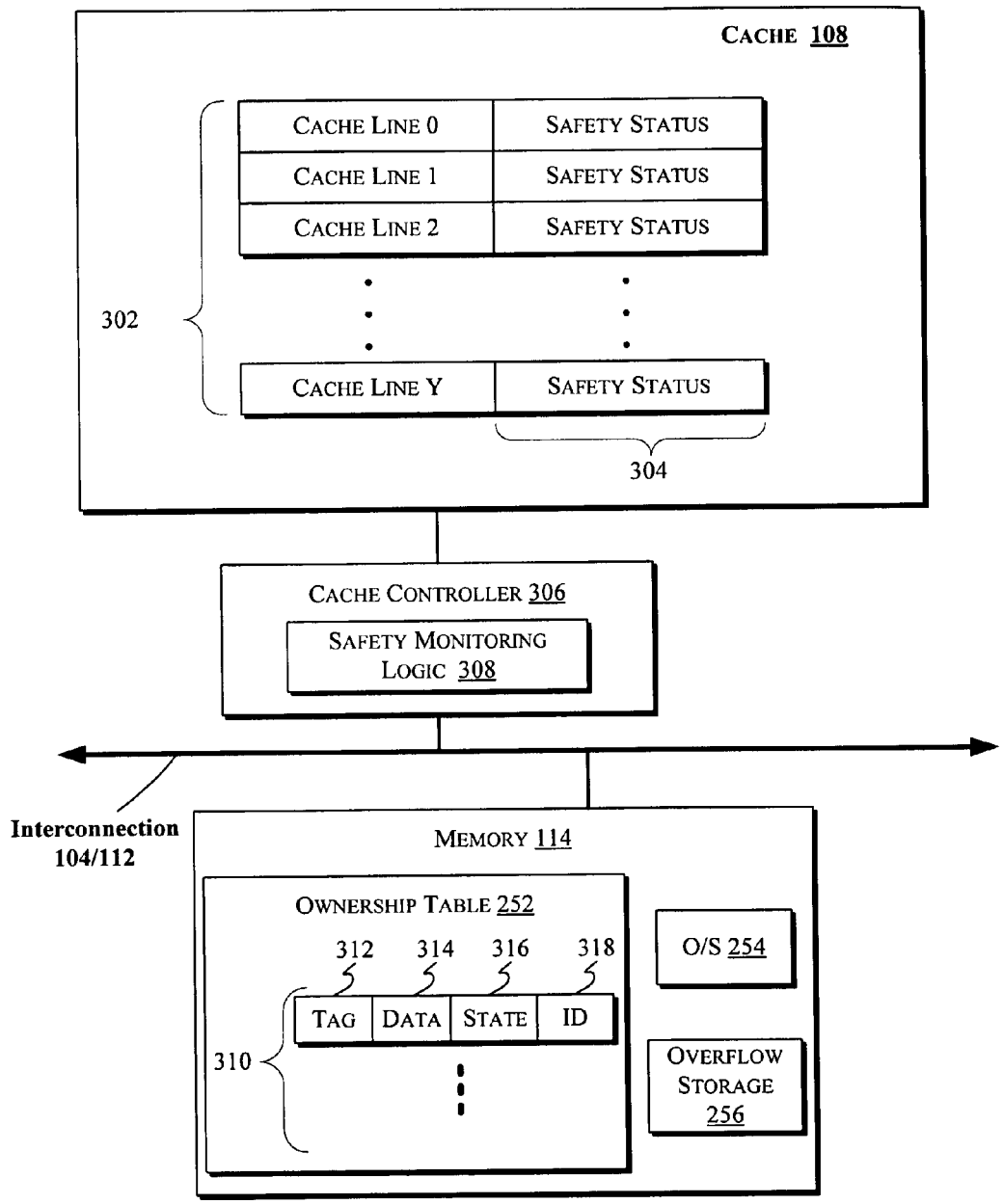
FIG. 3 illustrates a block diagram of portions of a cache and a memory, according to an embodiment of the invention.
Figure 4:
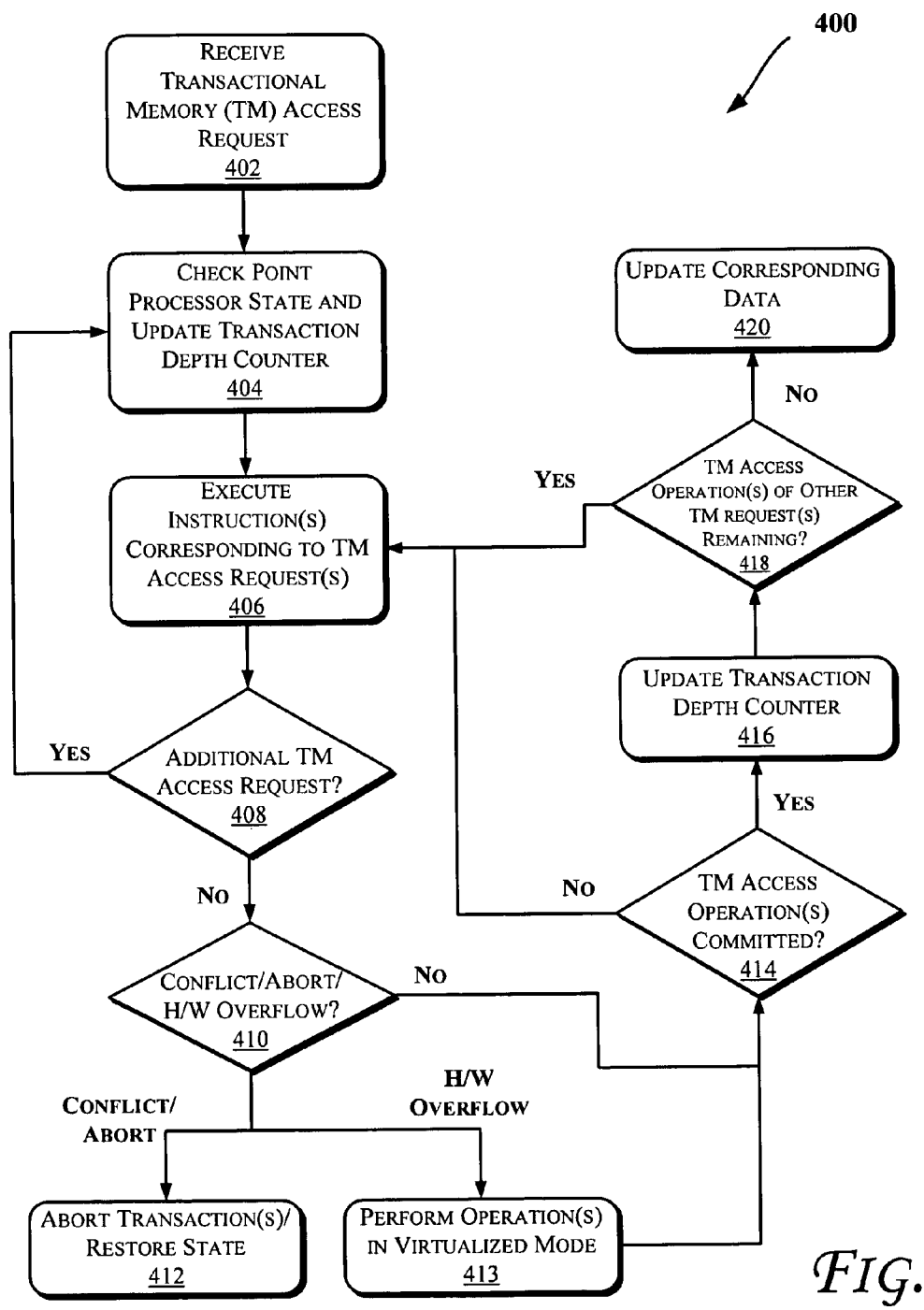
FIGS. 4-6 illustrate block diagrams of methods in accordance with various embodiments of the invention.
Figure 5:
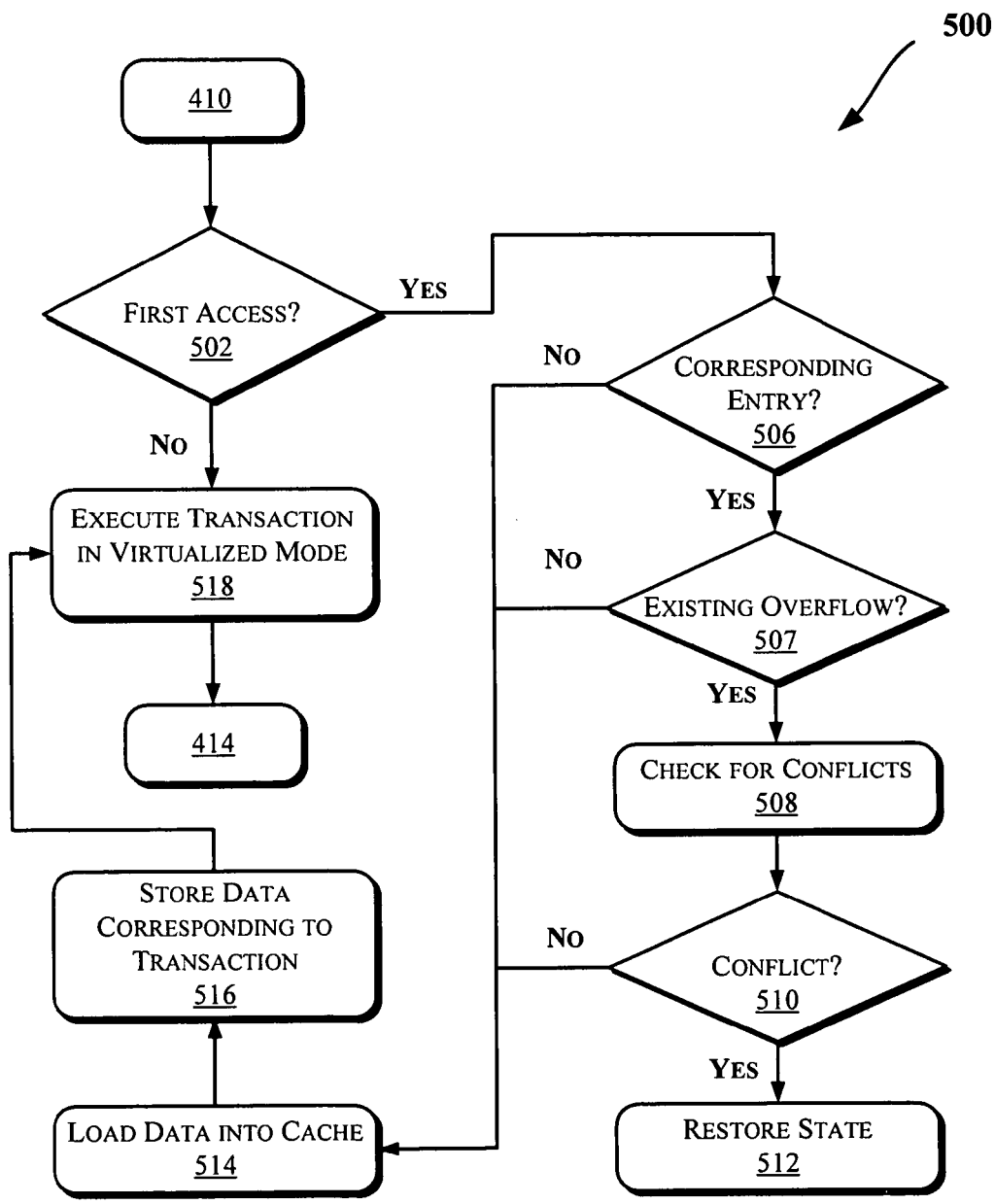
Figure 6:
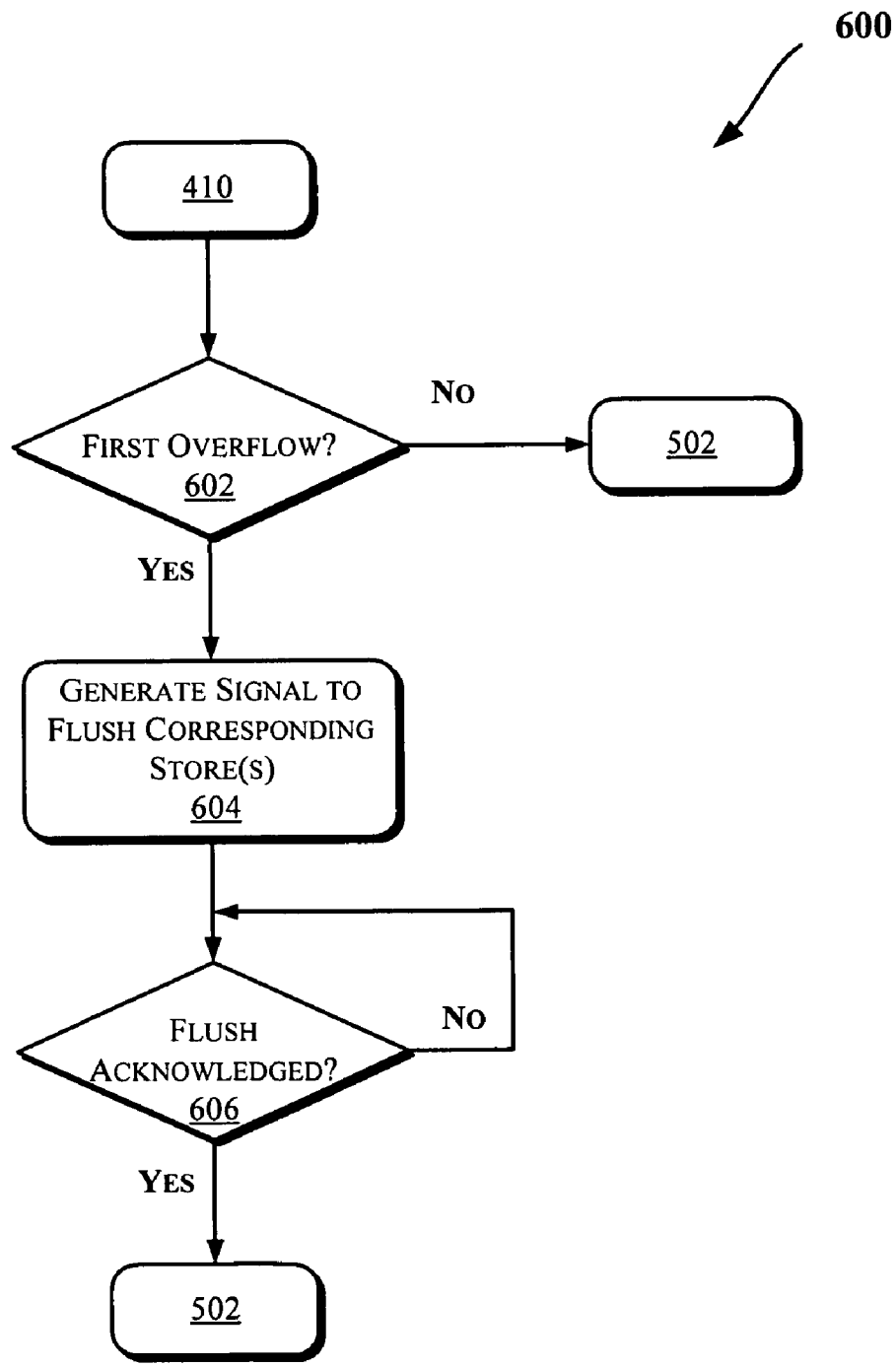

As shown in FIG. 2, the core 106 may include an overflow counter 250 (e.g., to store a value corresponding to the number of existing overflows caused by transactions executing on the core, a value corresponding to the number of existing overflows caused by multiple cores executing an application, and/or a value corresponding to the number of transactions that have overflowed on the core (or multiple cores) executing an application) and a corresponding overflow counter logic 251 (e.g., to update the value stored in the counter 250 as will be further discussed with reference to FIGS. 4-6). Also, the memory 114 may include an ownership table 252, an operating system (O/S) 254, and an overflow storage 256. As will be further discussed with reference to FIGS. 3-6, the table 252 and the storage 256 may store various data corresponding to transactions that have overflowed the cache 116. In one embodiment, the storage 256 and the table 252 may be implemented in a virtual memory (or persistent) portion of the memory 114, e.g., to provide persistence of data, for example, even if a thread is suspended or switched out of the core (106). Moreover, the O/S 254 may be utilized to communicate with various components of the computing systems of FIGS. 1 and 8-9. In one embodiment, the overflow counter 250 may also be used to synchronously (or asynchronously) control execution of all threads that are monitoring that location. For example, in an embodiment, a non-zero value stored in the overflow counter 250 may force all other threads to wait until that value returns to zero (e.g., all threads may wait or all threads intending to execute a transaction may wait for return to zero). Also, monitoring of the counter 250 may allow for non-invasive interrupts of a non-transactional thread in one embodiment; thus, allowing for atomicity even among threads executions that are "unaware" of transactional memory, e.g., third-party dynamic link libraries (DLLs) etc.

In one embodiment, one or more transaction status registers 260 may be included in the core 106. Each transaction status register 260 may correspond to a transaction that is executing on the core 106. A first transaction may store a value in the transaction status register 260 of a second transaction to indicate that the second transaction is to abort (e.g., due to a higher priority assigned to the first transaction than the second transaction, for example, to avoid conflicts). In an embodiment, each transaction may monitor its respective status register 260 to determine whether it should abort. For example, the status register 260 may be used to abort a transaction even in situations where the transaction may be suspended, e.g., switched out of the core (106) temporarily. This may allow other transactions to proceed without having to wait for an explicit abort. Also, the status registers 260 may be implemented in memory (e.g., within the cache 116, cache 108, and/or memory 114), instead of a hardware register.

FIG. 3 illustrates a block diagram of portions of a cache 108 and a memory 114, according to an embodiment of the invention. As shown in FIG. 3, the cache 108 may include one or more cache lines (302). The cache 108 may also include one or more safety status bits (304), where at least one bit 304 corresponds to each of the cache lines (302). In an embodiment, bits 304 may be for the same or similar operations as the bits 226 and 228. As will be further discussed herein, e.g., with reference to FIG. 5, the value stored in the bits 304 may indicate whether a respective cache line (302) has been copied into the cache 108 without checking the corresponding data stored in the table 252. Also, even though in FIG. 3, each cache line 302 is shown as having a respective bit 304, other configurations are possible. For example, a safety status bit (304) may correspond to a select portion of the cache 108, such as a cache block or other portion of the cache 108. Also, the bits 304 may be stored in locations other than the cache 108, such as in the cache 116 or the memory 114, for example.

A cache controller 306 may allow the cache 108 to communicate with other components of the system 100 of FIG. 1, e.g., via one or more of the interconnections 104 and/or 112. The cache controller 306 may include logic for various operations performed on the cache 108. For example, the cache controller 306 may include a safety monitoring logic 308 (e.g., update the data stored in the bits 304). Alternatively, the logic 308 may be provided within other components of the processors 102 of FIG. 1.

As shown in FIG. 3, the ownership table 252 may include one or more entries 310 corresponding to transactions (or transactional memory access requests) that have overflowed the cache 116. In one embodiment, each entry 310 may include one or more of: a tag field 312 (e.g., to identify the cache block or line that has overflowed, which may be a virtual address in an embodiment, but may further include other information to address aliasing issues), a data field 314 (e.g., to store data corresponding to a store operation), a state field 316 (e.g., indicating validity/invalidity of the data 314 and/or whether the overflowed transaction corresponds to a load or a store operation), and/or a transaction identifier (ID) field 318 (e.g., to identify the transaction that has caused the overflow). Further details regarding the operation of components of FIGS. 1-3 will now be discussed with reference to FIGS. 4-9.

More specifically, FIG. 4 illustrates a block diagram of an embodiment of a method 400 to execute one or more operations corresponding to a transactional memory access request. In an embodiment, various components discussed with reference to FIGS. 1-3 and 8-9 may be utilized to perform one or more of the operations discussed with reference to FIG. 4.

Referring to FIGS. 1-4, at an operation 402, a transactional memory access request (such as one or more memory load or store operations) is received. For example, the fetch unit 202 may fetch an instruction that indicates the start of a transactional memory execution. In accordance with at least one instruction set architecture, the instruction indicating the start of a transactional memory execution may be TXMBEG <user_handler_IP>, where user_handler_IP identifies a user handler procedure to which execution may be redirected in case of an abort, error, overflow, exception, or other fault conditions. Also, a transactional end instruction (such as TXMEND in accordance with at least one instruction set architecture) may indicate the end of a transaction. In one embodiment, all operations between the TXMBEG instruction and TXMEND may be marked as transactional. In an embodiment, the transactional operations may default to be transactional (and explicitly non-transactional, for example, through an instruction prefix or parameter), e.g., allowing non-transactional legacy libraries to be used transactionally without code changes. Alternatively, the transactional operations may default to be non-transactional (and explicitly transactional, for example, through an instruction prefix or parameter). In an embodiment, a special set of explicit non-transactional instructions may be utilized that are treated non-transactionally even though they may appear within a transaction, e.g., between a TXMBEG instruction and a TXMEND instruction. Also, in an embodiment, non-transactional store operations occurring within a transaction (e.g., between a TXMBEG instruction and a TXMEND instruction) may be executed by the execution unit 208 as write-through operations to the memory 114. In one embodiment, the setting for the default treatment of the operations may be provided with the TXMBEG instruction, e.g., provided through a corresponding parameter or prefix.

At an operation 404, the logic 232 may update the counter 230 (e.g., may increment or decrement the counter 230, depending on the implementation). In one embodiment, the execution of the TXMBEG instruction (e.g., by the execution unit 208) may result in updating of the counter 230. Alternatively, the counter 230 may be updated at issue time, e.g., when the schedule unit 206 issues the TXMBEG instruction. Also, at operation 404, the transaction check pointing logic 234 may check point the state of various components (e.g., counter 230, counter 250, and/or registers 240). For example, the logic 234 may store data corresponding to the state of one or more components of the cores 106 in a storage device (e.g., in the cache 116, cache 108, and/or memory 114). As will be further discussed herein, since the cores 106 may process more than one transactional memory access request at the same time (and/or speculatively), the logic 234 may store more than one state of various components of the cores 106, and in one embodiment the various states may be stored to a data structure that is implemented as a stack.

At an operation 406, one or more instructions (or operations) corresponding to the transactional memory access request of operation 402 may be executed, e.g., by the execution 208. During execution of instructions at operation 406, each time a portion of the cache 116 is accessed, the corresponding bit (e.g., bits 226 and/or 228 may be updated, for example, set or cleared depending on the implementation) to indicate access by a transactional memory request. For example, logic 239 may identify transactional instructions that are accessing the cache 116 and update the corresponding bits 226 and/or 228. In one embodiment, the instructions of operation 406 may be identified explicitly or implicitly as being a transactional or non-transactional operation, for example, by using a prefix (or control bit) that may be provided with the instruction and/or stored in a corresponding location, such as within a corresponding entry of the ROB 212.

At an operation 408, if another transactional memory access request is received, the method 400 continues with the operation 404. Otherwise, if no additional transactional memory access requests are received at operation 408, at an operation 410, it is determined whether a conflict, abort, or hardware overflow (e.g., as will be further discussed with reference to FIG. 5) condition corresponding to execution of the instructions of the operation 406 exists. If there is an abort (e.g., an explicit abort) or conflict with another instruction (which may be an instruction corresponding to another thread, e.g., executing on the same or a difference processor core), the transaction is aborted at an operation 412. For example, a conflicting instruction may send a snoop for an entry in the cache 116 that the transaction of operation 402 is accessing (or has marked as being accessed, as indicated by a value stored in bits 226 and/or 228).

In an embodiment, if a snoop results in invalidation of data stored in memory (such as stored in the cache 116), the load instruction at the head of the load buffer 216 may be included in the snoop check and a full address check may be performed (instead of a partial address check), e.g., by the MOB logic 219. If the load instruction at the head of the load buffer 216 conflicts with the snoop at operation 410, the corresponding transactional memory request may be aborted at operation 412. Alternatively, an explicit abort request may cause performance of operation 410. For example, in accordance with at least one instruction set architecture, the instruction indicating the abort of a transactional memory execution may be TXMABT. The abort instruction may result in explicit abort which, in case of multiple nested transactional memory access requests (e.g., as indicated by the value stored in the counter 230), may result in roll-back or restoration to a prior state and calling the corresponding handler (e.g., innermost handler in case of multiple pending transactional memory access requests that may be identified with the corresponding TXMBEG instruction such as discussed with reference to operation 402). In one embodiment, at operation 412, the transaction restoration logic 236 may restore various components of the cores 106 to a previous state such as discussed with reference to FIG. 2.

In one embodiment, when the cache 116 is evicted, the entries that have an active (e.g., set) bit 226 or bit 228 may be evicted last. If no further available space remains in the cache 116, the program execution may be redirected to a user handler (such as the handler of the corresponding TXMBEG instruction). Additionally, the fill buffers 222 may be used to service non-transactional operation(s) (e.g., store data) while a transaction is active but temporarily suspended.

If a hardware overflow condition exists at operation 410, one or more operations corresponding to the transaction that has caused the overflow are performed at an operation 413 in virtualized mode (e.g., by accessing a persistent portion of the memory 114 such as the table 252 and/or storage 256 in an embodiment). The operation 413 may not have any effect on other transactions and those transactions may proceed in a non-virtual mode. Further details of an embodiment corresponding to the operation 413 are discussed with reference to FIG. 5. At operation 410, if no conflicts, aborts, hardware overflows exist, an operation 414 determines whether the transactional memory access operation(s) corresponding to a transactional memory access request (e.g., as identified by a TXMBEG and a corresponding TXMEND instruction) are successfully committed (e.g., by the retirement unit 210). If the transactional memory access operation(s) remain uncommitted, the method 400 continues with the operation 406 to execute the corresponding instruction(s). Once the transactional memory access operation(s) corresponding to a transactional memory access request are successfully committed, the logic 232 updates the counter 230 at an operation 416. In one embodiment, execution (e.g., by the execution unit 208) or issuance (e.g., by the schedule unit 206) of the TXMEND instruction may result in commitment of a transactional memory access request, and hence performance of operation 416.

At an operation 418, it is determined whether any transactional memory access operation(s) corresponding to other transactional memory access requests remain uncommitted. In one embodiment, operation 418 may be performed by the logic 232, for example, by determining whether the value stored in the counter 230 indicates existence of remaining transactional memory access requests (e.g., when the counter 230 is not clear in an embodiment). If other operation(s) remain to be executed at operation 418, the method 400 continues with the operation 406. Once no further operations corresponding to transactional memory access requests remain (e.g., the counter 230 is clear), at an operation 420, the corresponding data (e.g., within the cache 116, cache 108, and/or memory 114) are updated atomically in accordance with operations of the committed transactional memory access request(s). Also, the TXMEND instruction may indicate a commit point for the corresponding transactional memory access request if the value stored in the counter 230 indicates that the TXMEND corresponds to the outermost transactional memory access (e.g., when the counter 230 is clear). In one embodiment, the corresponding bits 226 and/or 228, entries in the table 252, and/or data stored in the overflow storage 256 may also be updated (e.g., cleared in an embodiment) to indicate that no further transactional memory access requests are pending. Accordingly, the TXMEND instruction may result in an atomic commit, e.g., by ensuring that all speculation and/or exceptions have been resolved, all cache blocks that belong to the transaction write set are in exclusive state, and/or all blocks that belong to the read set are currently present and valid. Read or write sets as discussed herein may generally refer to sets of data within memory (e.g., cache 116) that correspond to bits 226 and 228, respectively. In an embodiment, the incoming snoops are stalled while the corresponding write set is being committed. In an embodiment, the commit point may also result in a jump or transfer of control to a commit handler to perform additional processing, e.g., prior to returning back.

In one embodiment, the cores 106 may execute various instructions (or operations) discussed with reference to the method 400 speculatively. Also, various operations of the method 400 may be performed out-of-order. For example, operations 406, 408, 410, or 413 may be performed in any order. Moreover, in an embodiment, snoop requests may be stalled prior to performance of operations 410, 412, 414, and/or 420 and unstalled after performance of operations 410, 412, 414, and/or 420.

FIG. 5 illustrates a block diagram of an embodiment of a method 500 to execute one or more operations corresponding to a transactional memory access request in a virtualized mode. In one embodiment, the method 500 may perform one or more operations corresponding to operation 413 of FIG. 4. In an embodiment, various components discussed with reference to FIGS. 1-3 and 8-9 may be utilized to perform one or more of the operations discussed with reference to FIG. 5.

Referring to FIGS. 1-5, at an operation 502 (e.g., after an overflow at operation 410), the virtualization logic 229 and/or the cache logic 239 may determine whether the overflow (410) corresponds to a transactional block that is accessed for the first time (e.g., either the corresponding bits 226 and/or 228 are not marked as transactional in the cache 116 or the access has missed the cache 116). If the overflowed access is the first access (502), the virtualization logic 229 may check the table 252 at operation 506 to determine if a corresponding entry exists in the table 252. If a corresponding entry exists in table 252, if the logic 251 determines that an overflow exists at an operation 507 (e.g., the value stored in the counter 250 is greater than zero in one embodiment), the virtualization logic 229 may check for conflicts between the transaction that has caused the overflow and other transactions that have an entry in the ownership table 252 at an operation 508. If a conflict exists (510), the method 500 may continue with operation 512 which restores the state of various components of the processor cores 106, for example, such as discussed with operation 412.

At an operation 514 (e.g., if a corresponding entry does not exist at operation 506, an existing overflow is absent at operation 507, and/or no conflicts are present at operation 510), the cache logic 239 loads the corresponding data for the transaction that has caused the overflow into the cache (e.g., cache 116 and/or 108). At an operation 516, the virtualization logic 229 may store data corresponding to the transaction that has caused a hardware overflow at operation 410. For example, the logic 229 may store data in an entry of the ownership table 252 such as discussed with reference to FIG. 3, e.g., to indicate access to a portion of the cache 116 in virtualized mode. In one embodiment, the data stored in field 314 may be the new data written by the overflowed transaction or the old data previously stored in the corresponding location of the cache 116. If new data is stored in 314, then on commits (e.g., at operation 420) the new values are copied into memory (e.g., memory 114). If old data is stored in 314, then on aborts (e.g., at operation 412) the original values are restored into memory (e.g., memory 114). In an embodiment, the table 252 may be shared by a plurality of threads executing on the cores 106. Alternatively, the table 252 may be accessible through a single thread. Also, instead of or in addition to the logic 229, the entries in the table 252 may be managed by a kernel (e.g., corresponding to the O/S 254) and/or user commands (such as a user handler). In one embodiment, each time an overflow occurs, the logic 251 may update the value stored in the counter 250 (e.g., by incrementing the previously stored value in an embodiment). Additionally, each time operations corresponding to an overflowed transaction commit (e.g., at operation 414), the value stored in the counter 250 is updated (e.g., decremented in an embodiment). Furthermore, at operation 516, the logic 234 may check point (or store) one or more states of various components of the core 106 such as discussed with reference to operation 404, e.g., to permit nested recovery such as discussed with reference to operation 512.

At an operation 518, if the overflowed access is not a first access (e.g., as determined by operation 502) and/or after operation 516, the logic 229 may cause execution of one or more instructions (or operations) corresponding to the overflowed transaction in virtualized mode, e.g., by utilizing the overflow storage 256 for loading and/or storing of data that would not fit in the cache (e.g., cache 116 and/or 108), and subsequently the method 500 resumes with the operation 414. In accordance with an embodiment, as long as the marked block is in the cache (e.g., as determined by operation 502), there is no need to check the overflow table 252 for subsequent accesses (reads or writes) to the same location at operation 506.

In various embodiments, at operation 512, the logic 236 may restore the state of the core 106 to various levels of a nested transaction, e.g., by restoring the state of various components of the cores 106 to an inner-most, an outer-most, or an intermediate nesting level of a transaction. In one embodiment, at operation 512, a software handler may be invoked to perform the nested recovery to the various levels (that may have been check pointed at operations 404 and/or 516), including recovery to an inner-most, an outer-most, or an intermediate nesting level of a transaction. Further details regarding a nested recovery performed by a user handler will be discussed with reference to FIG. 7. Furthermore, at operation 512, cache lines (e.g., 224) with a set bit 228 may be flushed out and/or invalidated to limit access to the invalid data by other threads that may result in incorrect execution. In an embodiment, the nested recovery handler may execute non-transactionally. In one embodiment, the table 252 may store priority information, for example, by using O/S (254) priority information or timestamp information that may be used when performing operations 518 and/or 512.

In one embodiment, to reduce the impact on non-transactional memory operations and non-virtualized transactions due to a virtualized transaction execution, an "unsafe" cache state may be used, e.g., to provide memory hierarchy optimization. Alternatively, a bit for each cache line or block may indicate whether the corresponding line or block is unsafe such as discussed with reference to bits 304 of FIG. 3. The cache state may encompass the cache hierarchy of the processors 102 of FIG. 1. This state (or bit) may indicate that a cache block or line (e.g., 302 and/or 224) has been brought in to the cache (e.g., 108 or 116, respectively) without consulting the table 252. If no overflows exist (507), then any request (such as a hardware prefetch) that misses a last level cache (108) may bring in the corresponding data from memory (114) and tag it with the "unsafe state." In one embodiment, eviction of a cache block (e.g., 302 and/or 224) with an active bit 228 (e.g., a bit 228 that is set in an embodiment) would result in a flush to memory (114). In the presence of the unsafe state (or bit), it may result in the unsafe state being marked for the corresponding cache block. This allows any core (106) to access any cache block without incurring the overhead of checking the table 252 at operation 506 if the unsafe state is not set. If the unsafe state is set, then an access to the corresponding block may result in a message back to the requesting operation to request consultation of the table 252. In an embodiment, hardware prefetchers of the cores 106 may be disabled while the value stored in the counter 250 indicates existence of an overflow. In embodiments that utilize the unsafe state (or bit) for the cache may allow prefetching while providing correct execution. In one embodiment, membership in the table 252 may be explicitly cached and maintained via cache coherence protocols.

FIG. 6 illustrates a block diagram of an embodiment of a method 600 to provide data correctness when a processor executes a non-transactional store operation and a transaction in virtualized mode. In an embodiment, various components discussed with reference to FIGS. 1-3 and 7-9 may be utilized to perform one or more of the operations discussed with reference to FIG. 6.

Referring to FIGS. 1-6, after operation 410, the overflow counter logic 251 may determine whether a first overflow is about to occur at an operation 602 (e.g., the value stored in the counter 250 is transitioning from a zero to an non-zero value in an embodiment). In the absence of a first overflow (602), the method 600 continues with operation 502. Otherwise, at an operation 604, the logic 251 may generate a signal to indicate to other threads or cores (106) that share the same counter 250 (e.g., through a shared memory location) to check their respective store buffers 218 and flush any store operations (e.g., in the oldest portion of the store buffer 218 which may be referred to "senior stores") that are retired by the retirement unit 210 and not written yet to cache (e.g., cache 108 and/or cache 116) and/or memory (e.g., memory 114). Once the core (106) executing the thread that has caused performance of the operation 604 receives an acknowledgement (which, in one embodiment, may be provided through a handshake protocol (e.g., included in a software handler such as the handler discussed with reference to FIG. 4) which may be invoked when the overflow counter 250 is transitioning from 0 to 1) that all corresponding stores have been flushed from their respective store buffers 218, the method 600 may resume with operation 502. In an embodiment, the core 106 may determine whether all acknowledgements have been received at operation 606 in accordance with a value stored in the cache 116 that indicates the number of corresponding threads that operate on the same data (e.g., all threads that are executing on the same core 106, or other cores 106 that may be executing threads associated with the same application program). Moreover, an embodiment may utilize cache coherence protocols to determine the outcome at operation 606, for example, by referring to a shared location in the cache 116 that indicates the number of corresponding threads that operate on the same data. In one embodiment, once a core (106) receives the signal of operation 604, it may transition to a special mode where store operations become senior in the store buffer 218 and are issued to the cache 116 when the store is at the head of the reorder buffer 212. Moreover, after operation 413 (e.g., once no more corresponding transactions are operating in virtualized mode, such as indicated by the value stored in the counter 250), the core that has entered the special mode may revert to normal operation.

FIG. 7 illustrates an embodiment of a transaction status and control register (TXSR) 700. In one embodiment, the TXSR register 700 may be used to implement various embodiments discussed herein, e.g., with reference to FIGS. 1-6. For example, the registers 240 of FIG. 2 may include the TXSR register 700 in one embodiment. Moreover, the operations discussed with reference to FIGS. 1-6 may be performed by accessing the register 700.

As shown in FIG. 7, the TXSR register 700 may include one or more entries 702 (or bits in an embodiment). Each entry 702 may have the illustrated name (504) in accordance with at least one instruction set architecture. Also, each entry 702 may have a corresponding class 706, e.g., to group bits that are similar in one category. FIG. 7 additionally shows a description 708 corresponding to each entry 702. In an embodiment, the class information 706 and description 708 are for informational purposes and may not be stored in the actual register 500. In one embodiment, if one of the entries 702 indicates the status identified by the description 708, one or more actions 710 may be taken. In FIG. 7, TXDR and TXFR may be registers (e.g., included with the registers 240 of FIG. 2) for debug purposes. For example, TXDR may store the address of a memory instruction or the snoop address of a data conflict before a transaction aborts operation. Moreover, TXFR may store the instruction pointer (IP) of a faulting instruction that has caused a transaction to abort. In one embodiment, the values stored in TXDR and TXFR may be read by a transaction handler routine (e.g., a handler that is identified by the TXMBEG) after the abort to allow software to determine the addresses that caused the abort.

Referring to FIGS. 1-7, in an embodiment, the TXMBEG instruction discussed with reference to FIG. 4 may perform one or more of the following actions depending upon the status of the TXSR register 700:

1. The TXMBEG instruction may transition execution into an atomic execution mode where operations following the instruction are executed in a recoverable mode. Any updates performed by instructions while the core 106 is in this mode can be discarded at any time. To allow register state recoverability, some of the registers 240 may be check pointed by the logic 234. Operations that cannot be undone if executed may result in an error, transaction updates discarded, and/or control transferred to the handler identified by the TXMBEG instruction.

2. The TXMBEG instruction may also perform a conditional control transfer depending upon the state of the TXSR register 700. If the appropriate TXSR bits are set, the TXMBEG instruction may transfer program control to a different point in the instruction stream corresponding to the transactional memory access request without recording return information. The destination (target) operand may specify the address to which the instruction is jumping. When a TXMBEG performs a conditional control transfer, the core 106 may not transition into a recoverable execution mode, and execution may be similar to that of a JMP (or jump) instruction in accordance with at least one instruction set architecture.

Referring to FIGS. 1-7, in an embodiment, the TXMEND instruction discussed with reference to FIG. 3 may perform the following pseudo code depending upon the status of the TXSR register 700 (in one embodiment, tmpmemstatus below may be a state continuously gated to indicate whether all cache blocks in the cache 116 are in an appropriate state):

```
IF TXSR.exec_state != X_ACTIVE
        THEN
                Illegal Opcode_ERROR
FI
IF —TXND != 0
        THEN
                Done; (*nested block retired *)
FI
IF (!VTM)    (* not virtualized mode*)
    THEN
        IF (tmpmemstatus)
            THEN
                TXSR.e  xec_state = X_COMMITTING
                commit_cache_rtm_mode( )
                TXSR <- 0
                Done
            ELSE (* could not commit memory state *)
                TXSR.exec_state = X_ABORTING
                abort_cache_rtm_mode( )
                TXSR.exec_state = X_ABORTED
                TXSR.attempt_state++(saturating)    (* to track the
                                                number of failed attempts *)
                JMP to TXIP
                (* restore SP etc. *)
        FI
```

-continued

```
ELSE (* in VTM MODE *)
    IF TXSR.C_VTM_MODE && TXSR.XSW = COMMITTED
        THEN
            TXSR <- 0
            commit_cache_vtm_mode( )
            Done;
    ELSE IF TXSR.C_VTM_MODE && TXSR.XSW != ABORTED
    THEN
            invoke_microcode_setup_commit( )
            (* tries to Compare&Swap TXSR.XSW to COMIT-
TED if
            succesful, then signals s/w lib *)
        replay_op( )
    ELSE IF TXSR.C_VTM_MODE && TXSR.XSW = ABORTING
        THEN
            invoke_microcode_setup_abort( )
            (* TXSR.XSW <- ABORTED *)
            (* signal software library *)
        ELSE
            ASSERT (TXSR.XSW == ABORTED)
            TXSR <- 0
            abort_cache_vtm_mode( )
        FI
    FI
    FI
FI  (* end of !C_VTM_MODE *)
```

In one embodiment, for all commits and aborts of VTM may be re-directed to a user handler (such as the handler identified by TXMBEG) that then calls a software library based on the TXSR 700 states. Also, the jump may be to the beginning of the atomic block, and then depending upon the status of the TXSR 700, the user handler may be called.

Referring to FIGS. 1-7, in an embodiment, the TXMABT instruction discussed with reference to FIG. 3 may allow a user to explicitly abort the atomic block execution. The effect may be similar to when the execution aborts, and all updates are discarded (except for the register 700 bits). In one embodiment, the TXMABT instruction may perform the following pseudo code depending upon the status of the TXSR register 700:

```
IF TXSR.exec_state!=X_ACTIVE
    THEN
        Illegal Opcode_ERROR
FI
discard_speculative_updates_cache( )
IF (TXSR.C_VTM_MODE!=0||TXSR.XSW!=OVF)
    THEN
        restore_architectural_register_state( )(*SP/IP*)
        TXSR.exec_state=XABORTED
    ELSE
        TXSR.exec_state=X_ABORTING
        (*if vtm abort is microcode assist*)
        Invoke_microcode_assit_for_abort_cleanup( )
        TXSER.exec_state=X_ABORTED
FI
TXSR.attempt_state++(saturating)
JMP to TXIP
```

In one embodiment, if a user handler is to recover to the outermost handler at operation 512 and if the software saved all register states such as discussed with reference to operations 404 and/or 516, then the software may repair the stored information (e.g., data stored in a stack such as discussed with reference to FIGS. 3-5), restore the register states and update the corresponding bits in TXSR 700. The repair may involve the handler restoring the system stack pointer (ESP) to the point post the register check points (e.g., pushes on to a stack), and then pop appropriately. The restoring of ESP until just post the register pushes may permit that any ESP updates due to calls etc. made within the transaction are properly repaired.

In an embodiment, the state saved on the stack may include the following: ESP, TXIP (optionally the hander address also), registers 240). In one embodiment, the TXSR 700 may correspond to the outermost. If the hardware saved the states, the hardware may perform the former operations.

In one embodiment, if a user handler needs to recover to the innermost handler at operation 512:

Software may perform all nested recovery actions (the software handler is expected to have saved all states).

When a software library is written for use in a transaction, and nested recovery is to be performed (if the library call asserts such an action, then the user handler of that call may be called instead of the outermost handler). In this case, the user handler may determine whether to perform nested recovery or abort to the outer handler. This allows for the aborts to thread all the way back to the outermost transaction. Otherwise, if a legacy library (one that does not support transactional memory accesses) is called and aborts, then the failures may return to the innermost transaction that called the library.

The handler may walk the memory log (e.g., stored in memory 114) in reverse order and restore the state to a particular nesting level, e.g., by updating the corresponding values, and then restarting the transaction from that point. Alternatively, the handler may pop data from the stack and redirect fetch unit 202 to the last level handler with the corresponding bit in the TXSR 700 indicating an abort (such as one of the bits 10-12 that inform the handler why it is being called).

The stored log may have sufficient information to aid in reconstruction of the states. Hardware, microcode, software assists (or routines), or combinations thereof may create the log on the fly in VTM mode if nested aborts are to be performed. In RTM mode, this may not be done.

The log and library to restore the log may be platform-specific with defined interfaces). A sample log format (in program order) may be as follows (where the "nesting level" may correspond to the value stored in the depth counter 230):

<address><original value prior to write><nesting level>
<nesting level transition>
<address><original value prior to write><nesting level>

In the above example, a reverse walk of the log may enable the software library to "un-ambiguously" recover state to a particular nesting level and the embedded <nested level transition> may aid in this. Also, each <original value prior to write> may be unique for a particular nesting level. Moreover, walking the log back, the user handler may determine which values are intermediately logged values (that may still correspond to a pending transaction and not the original values) and which are not. The hardware may include a microcode support to perform this log in an embodiment.

Figure 8:
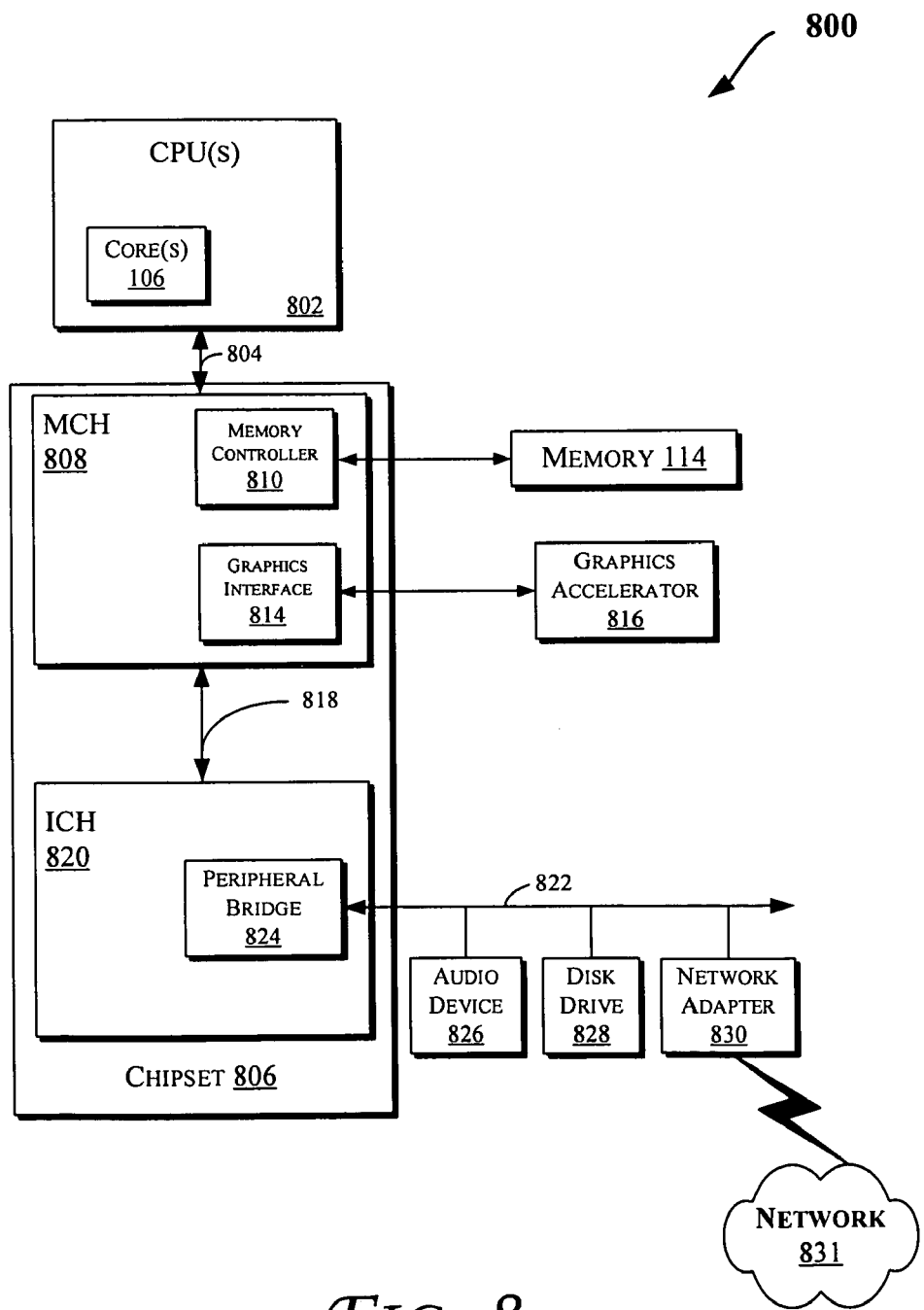

FIG. 8 illustrates a block diagram of an embodiment of a computing system 800. The computing system 800 may include one or more central processing unit(s) (CPUs) or processors 802 that communicate with an interconnection (or bus) 804. In an embodiment, the processors 802 may be the same as or similar to the processors 102 of FIG. 1. Also, the interconnection 804 may be the same as or similar to the interconnections 104 and/or 112 discussed with reference to FIGS. 1-2. The processors 802 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 802 may have a single or multiple core design, e.g., including one or more processor cores (106) such as discussed with reference to FIGS. 1-2. The processors 802 with a multiple core design may integrate different types of processor cores on the same integrated circuit (IC) die. Also, the processors 802 with a multiple core design may be implemented as symmetrical or asymmetrical multiprocessors.

As shown in FIG. 8, a chipset 806 may communicate with the interconnection 804. The chipset 806 may include a memory control hub (MCH) 808. The MCH 808 may include a memory controller 810 that communicates with the memory 114. The memory 114 may store data, e.g., including sequences of instructions that are executed by the processors 802, or any other device in communication with the computing system 800. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Nonvolatile memory may also be used such as a hard disk. Additional devices may communicate via the interconnection 804, such as multiple processors and/or multiple system memories.

The MCH 808 may additionally include a graphics interface 814 in communication with a graphics accelerator 816. In one embodiment, the graphics interface 814 may communicate with the graphics accelerator 816 via an accelerated graphics port (AGP). In an embodiment of the invention, a display (such as a flat panel display) may communicate with the graphics interface 814 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 818 may enable communication between the MCH 808 and an input/output (I/O) control hub (ICH) 820. The ICH 820 may provide an interface to I/O devices in communication with the computing system 800. The ICH 820 may communicate with a bus 822 through a peripheral bridge (or controller) 824, such as a peripheral component interconnect (PCI) bridge or a universal serial bus (USB) controller. The bridge 824 may provide a data path between the processor 802 and peripheral devices. Other types of topologies may be utilized. Also, multiple buses may communicate with the ICH 820, e.g., through multiple bridges or controllers. Moreover, other peripherals in communication with the ICH 820 may include, in various embodiments of the invention, integrated drive electronics (IDE) or small computer system interface (SCSI) hard drive (s), USB port(s), a keyboard, a mouse, parallel port(s), serial port(s), floppy disk drive(s), or digital data support interfaces (e.g., digital video interface (DVI)).

The bus 822 may communicate with an audio device 826, one or more disk drive(s) 828, and a network adapter 830. The network adapter 830 may communicate with a computer network 831, e.g., enabling various components of the system 800 to send and/or receive data over the network 831. Other devices may communicate through the bus 822. Also, various components (such as the network adapter 830) may communicate with the MCH 808 in some embodiments of the invention. In addition, the processor 802 and the MCH 808 may be combined to form a single chip. Furthermore, the graphics accelerator 816 may be included within the MCH 808 in other embodiments of the invention.

In an embodiment, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 9:
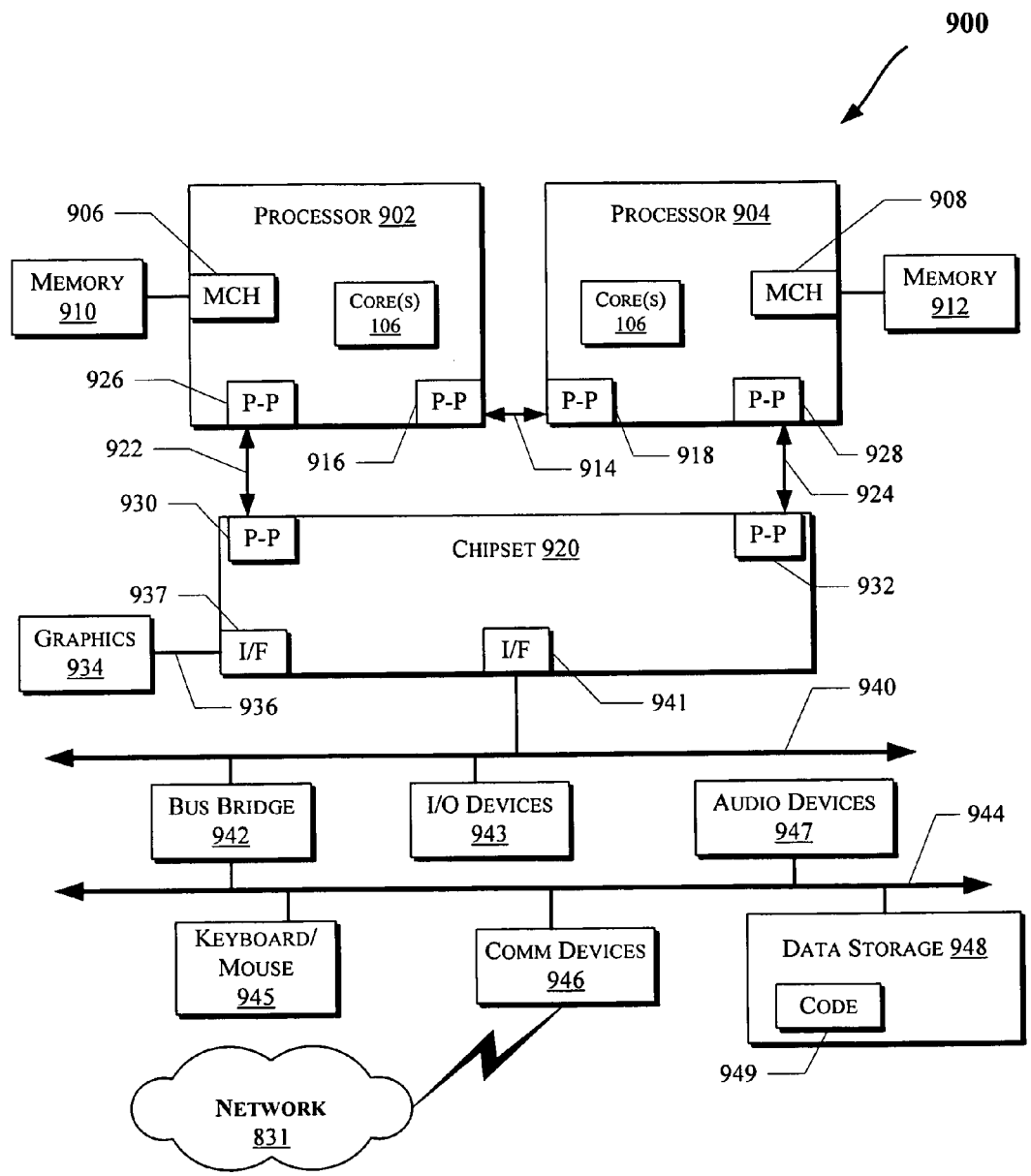

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-6 may be performed by one or more components of the system 900.

As illustrated in FIG. 9, the system 900 may include several processors, of which only two, processors 902 and 904 are shown for clarity. The processors 902 and 904 may each include a local memory controller hub (MCH) 906 and 908 to enable communication with memories 910 and 912. The memories 910 and/or 912 may store various data such as those discussed with reference to the memory 114 of FIGS. 1-3 and 8.

In an embodiment, the processors 902 and 904 may be one of the processors 802 discussed with reference to FIG. 8. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

At least one embodiment of the invention may be provided within the processors 902 and 904. For example, one or more of the cores 106 of FIG. 1 or 2 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9. The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices (e.g., the network adapter 830 of FIG. 8), or other communication devices that may communicate with the computer network 831), audio I/O device, and/or a data storage device 948. The data storage device 948 may store code 949 that may be executed by the processors 902 and/or 904.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-9.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment. Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
   a first logic circuitry to store data corresponding to a transactional memory access request in a first portion of a memory in response to an overflow condition caused by the transactional memory request;
   a second logic circuitry to update a first value in response to the overflow condition, wherein one or more store operations, which are retired and not yet written to cache or memory, are to be flushed from one or more store buffers in response to a transition of a counter from a first state to a second, different state, wherein the counter transition is to indicate a first occurrence of the overflow condition and wherein the one or more store operations, which are retired and not yet written to cache or memory, are not to be flushed from the one or more store buffers in response to a subsequent transition of the counter from the second state.

2. The processor of claim 1, further comprising a third logic to perform one or more operations corresponding to the transactional memory access request in accordance with the stored data.

3. The processor of claim 2, wherein the one or more operations correspond to one or more of a load operation or a store operation.

4. The processor of claim 2, wherein the third logic causes at least some of one or more operations corresponding to the transactional memory access request to be executed speculatively.

5. The processor of claim 1, wherein the first portion of the memory comprises one or more entries corresponding to the transactional memory access request.

6. The processor of claim 5, wherein the one or more entries comprise one or more of a tag field, a data field, a state field, or a transaction identifier field.

7. The processor of claim 1, further comprising a third logic to restore a state of one or more components of the processor after at least one operation corresponding to the transactional memory access request fails to commit.

8. The processor of claim 7, wherein the third logic restores the state of the one or more components of the processor to one or more of an inner-most, an outer-most, or an intermediate nesting level of the transactional memory access request.

9. The processor of claim 1, further comprising a third logic to abort the transactional memory access when a conflict with a different instruction occurs.

10. The processor of claim 9, wherein the different instruction is an instruction corresponding to a different transactional memory access request.

11. The processor of claim 1, further comprising a third logic to generate a signal to flush the one or more corresponding store operations from the one or more store buffers in response to an indication that a first occurrence of overflow into the first portion of the memory is about to occur.

12. An apparatus comprising:
    a counter to count a number of transactional memory access requests that have caused an overflow condition, wherein one or more store operations, which are retired and not yet written to cache or memory, are to be flushed from one or more store buffers in response to a transition of a counter from a first state to a second, different state, wherein the counter transition is to indicate a first occurrence of the overflow condition and wherein the one or more store operations, which are retired and not yet written to cache or memory, are not to be flushed from the one or more store buffers in response to a subsequent transition of the counter from the second state.

13. The apparatus of claim 12, wherein a value of the counter corresponds to a number of existing overflow transactions that have caused an overflow into a first portion of a memory.

14. The apparatus of claim 12, further comprising a first logic to control execution of one or more transactional memory requests in accordance with a value of the counter.

15. The apparatus of claim 12, further comprising one or more processor cores to perform one or more operations corresponding to one or more of the transactional memory access requests.

16. The apparatus of claim 15, wherein the one or more processor cores and the counter are on a same die.

17. The apparatus of claim 12, further comprising a cache to store data corresponding to one or more of the transactional memory access requests, wherein the cache comprises one or more bits to indicate an access corresponding to the one or more transactional memory access requests to a portion of the cache.

18. The apparatus of claim 17, further comprising a first logic to access the one or more bits to determine a previous access to the portion of the cache.

19. The apparatus of claim 17, wherein the portion of the cache is one or more of a cache line or a cache block.

20. The apparatus of claim 17, wherein the cache comprises one or more of a mid-level cache (MLC) or a last-level cache (LLC).

21. The apparatus of claim 12, further comprising a logic to generate a signal to flush the one or more corresponding store operations from the one or more store buffers in response to a determination that the counter is about to indicate a first occurrence of an overflow.

22. A method comprising:
    storing data corresponding to a transactional memory instruction that has caused a hardware overflow into a persistent portion of a memory;

updating a stored value corresponding to a number of transactional memory access requests that are uncommitted in response to at least the first instruction; and performing one or more operations in response to the first instruction in accordance with the stored data, wherein one or more store operations, which are retired and not yet written to cache or memory, are to be flushed from one or more store buffers in response to a transition of a counter from a first state to a second, different state, wherein the counter transition is to indicate a first occurrence of the overflow condition and wherein the one or more store operations, which are retired and not yet written to cache or memory, are not to be flushed from the one or more store buffers in response to a subsequent transition of the counter from the second state.

23. The method of claim 22, further comprising generating a signal to flush the one or more corresponding store operations from the one or more store buffers in response to an indication that a first occurrence of overflow into the persistent portion of the memory is about to occur.

24. The method of claim 22, further comprising restoring a state of one or more components of a processor after at least one of the one or more operations fails to commit.

25. The method of claim 22, further comprising determining whether the hardware overflow corresponds to a cache overflow or a cache miss.

26. A system comprising:
a first memory to store data;
a processor to fetch a first instruction corresponding to a start of a transactional memory access and a second instruction corresponding to an end of the transactional memory access, the processor to store data corresponding to a transactional memory access request that has caused a second memory to overflow in the first memory and to update a value stored in a storage unit in response to performing one or more of the first instruction and the second instruction, wherein one or more store operations, which are retired and not yet written to cache or memory, are to be flushed from one or more store buffers in response to a transition of a counter from a first state to a second, different state, wherein the counter transition is to indicate a first occurrence of the overflow condition and wherein the one or more store operations, which are retired and not yet written to cache or memory, are not to be flushed from the one or more store buffers in response to a subsequent transition of the counter from the second state.

27. The system of claim 26, further comprising a fourth logic to restore a state of one or more components of the processor after at least one of one or more operations corresponding to the transactional memory access fails to commit.

28. The system of claim 26, further comprising a fourth logic to generate a signal to flush the one or more corresponding store operations from the one or more store buffers in response to an indication that a first occurrence of overflow into the first memory is about to occur.

29. The system of claim 26, further comprising an audio device.

30. A storage device to store one or more instructions that when executed on a processor configure the processor to:
store data corresponding to a transactional memory instruction that has caused a hardware overflow into a persistent portion of a memory;
update a stored value corresponding to a number of transactional memory access requests that are uncommitted in response to the transactional memory instruction, and
restore a state of one or more components of a processor core after at least one operation corresponding to the transactional memory instruction fails to commit, wherein one or more store operations, which are retired and not yet written to cache or memory, are to be flushed from one or more store buffers in response to a transition of a counter from a first state to a second, different state, wherein the counter transition is to indicate a first occurrence of the overflow condition and wherein the one or more store operations, which are retired and not yet written to cache or memory, are not to be flushed from the one or more store buffers in response to a subsequent transition of the counter from the second state.

31. The storage device of claim 30, wherein the storage device is to store one or more instructions that configure the processor to execute one or more operations corresponding to a user handler in response to the transactional memory instruction.

32. The storage device of claim 30, wherein the storage device is to store one or more instructions that configure the processor to determine whether the hardware overflow corresponds to a cache overflow or a cache miss.

33. The storage device of claim 30, wherein the storage device is to store one or more instructions that configure the processor to generate a signal to flush the one or more corresponding store operations from the one or more store buffers in response to an indication that a first occurrence of overflow is about to occur.

* * * * *